May 15, 1962 R. W. HOUSMAN 3,035,168

BRACKET FOR PORTABLE RADIO

Filed April 11, 1960 2 Sheets-Sheet 1

INVENTOR.
Robert W. Housman
BY
Ezekiel Wolf, Wolf + Greenfield

May 15, 1962 R. W. HOUSMAN 3,035,168

BRACKET FOR PORTABLE RADIO

Filed April 11, 1960 2 Sheets-Sheet 2

Robert W. Housman INVENTOR.

BY

Ezekiel Wolf, Wolf + Greenfield

United States Patent Office 3,035,168

Patented May 15, 1962

3,035,168

BRACKET FOR PORTABLE RADIO

Robert W. Housman, Winthrop, Mass., assignor to Automatic Radio Mfg. Co., Inc., Boston, Mass., a corporation of Massachusetts Filed Apr. 11, 1960, Ser. No. 21,161
7 Claims. (Cl. 250—14)

The present invention relates to a bracket for mounting a portable radio.

It is an object of the present invention to provide a bracket designed to be secured to the dashboard of a car or other suitable structure for mounting a portable radio in an operable position. It is also an object of the present invention to provide a mounting bracket for a portable radio with means for coupling an external antenna, speakers, and power supply to the radio.

A further object of the present invention is to provide a mounting bracket which may be easily secured to an instrument panel or similar supporting structure, and in turn provides an accessible support for a portable radio. A further object of the present invention is to provide an inexpensive mounting bracket for a portable receiver which functions both as a mechanical support and an electrical coupling device for external components.

In the present invention there is provided a T-shaped member having depending lips formed at the opposite ends of the cross bar of the T-shaped member. These lips are adapted to interengage projections on opposite sides of a rectangular shaped receiver. An arm section integral with the free end of the stem of the T-shaped section is adapted to extend partially around the radio in a clamping relation. The arm section supports coupling members for electrically coupling the portable receiver with an external antenna, power supply and speaker.

These and other objects and advantages of the present invention will be more clearly understood when considered in conjunction with the accompanying drawings in which.

Figures 5, 6, 7:
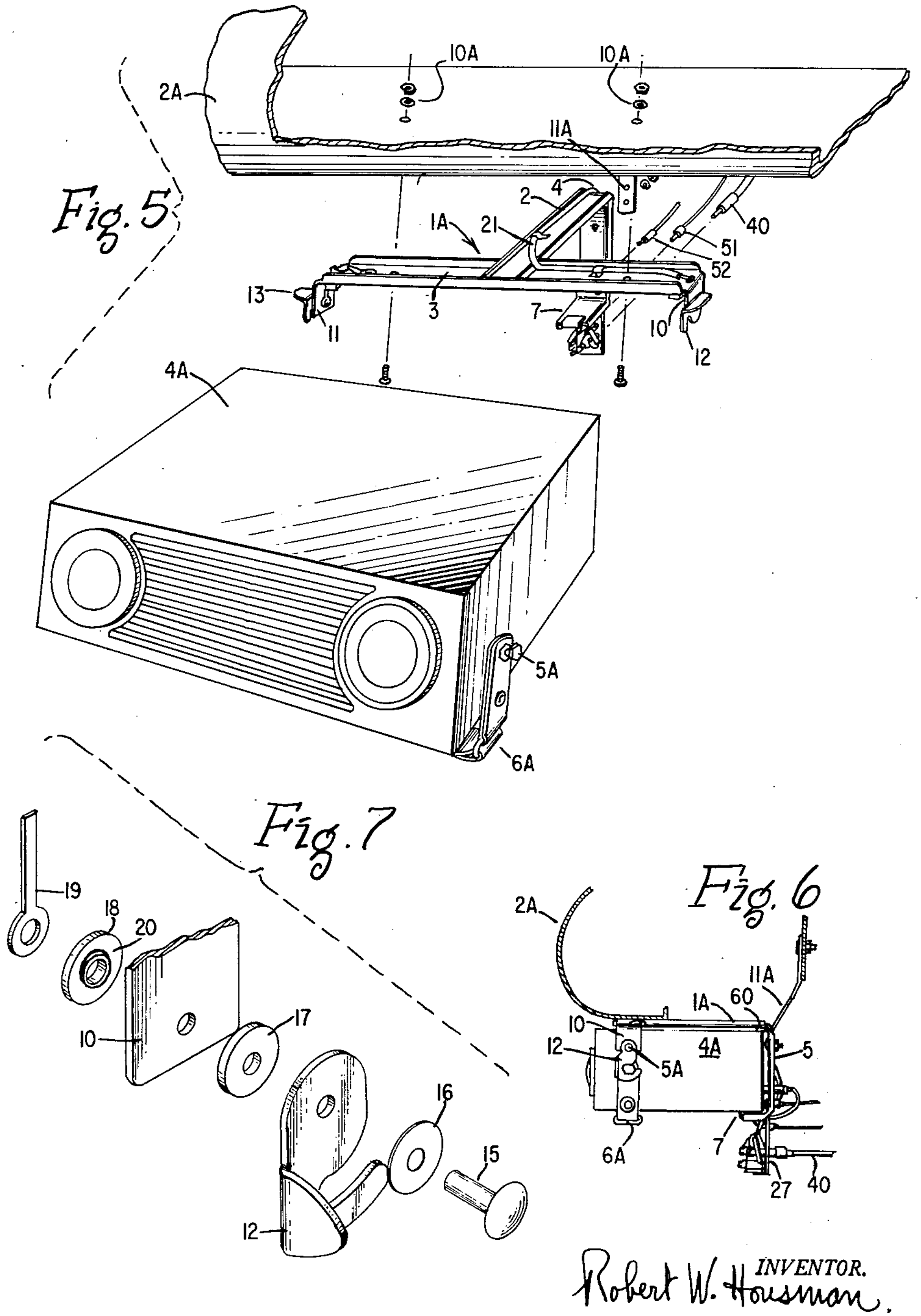
FIG. 5 is a front perspective view of the present invention shown in exploded relation with a dashboard, and portable radio.
FIG. 6 is a side view showing a radio secured to the bracket and the bracket secured to a dashboard, and, FIG. 7 is a perspective exploded view of a detail of the present invention.

The mounting bracket generally illustrated at 1A in FIGS. 5 and 6 may be secured to a supporting structure such as a dashboard 2A by bolts and nuts 10A and supporting strap 11A. The bracket in turn has members adapted to receive and secure a portable radio 4A. In addition, the bracket is formed with means for coupling an external speaker, ground, power supply and antenna to the radio. For such coupling the radio 4A is provided with external sockets or outwardly extending conductive projections on opposite sidewalls including projection 5A and a similar projection on the other side coupled internally to the radio circuitry. These may if desired also form supporting shafts for the supporting handle 6A.

The bracket itself has a T shaped member 1A formed of a stem 2 and cross bar 3 with the cross bar 3 suitably secured by spot welding or the like to the stem 2. The free end 4 of the stem 2 is bent normally forming an arm section 5. The free end 6 of the arm section 5 is also bent normally forming a lip 7. The T-shaped member 1A, arm section 5, and lip 7 are formed with flanged edges 9 for structural strength.

The free ends of the cross bar 3 are flared normally forming lips 10 and 11. Hooks 12 and 13 are pivotally supported at the ends of these lips 10 and 11 respectively.

These hooks 12 and 13 function both as supports at either side of the radio and in part as electrical coupling means for connecting an external antenna and for externally grounding the radio. Hook 12 may engage and electrically couple projection 5A which in turn is connected to the internal antenna circuit. Hook 13 may engage and electrically couple the other projection which in turn is connected to the radio ground.

Figure 1:
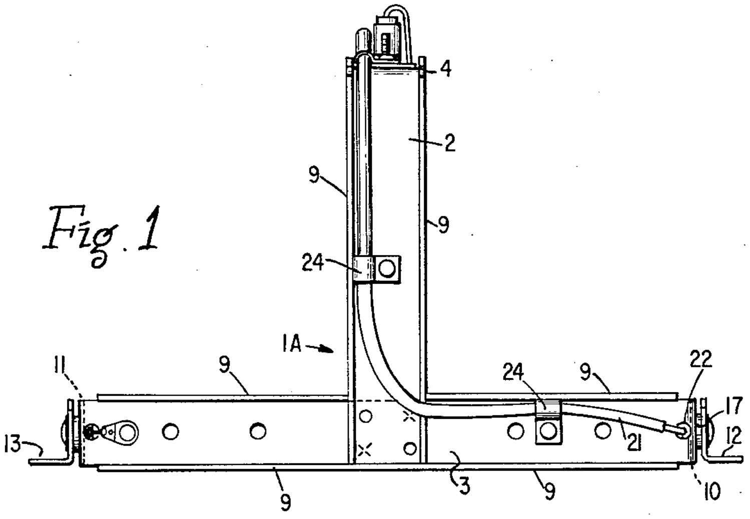
FIG. 1 is a top plan view of a preferred embodiment of the present invention.
Figures 2, 3, 4:
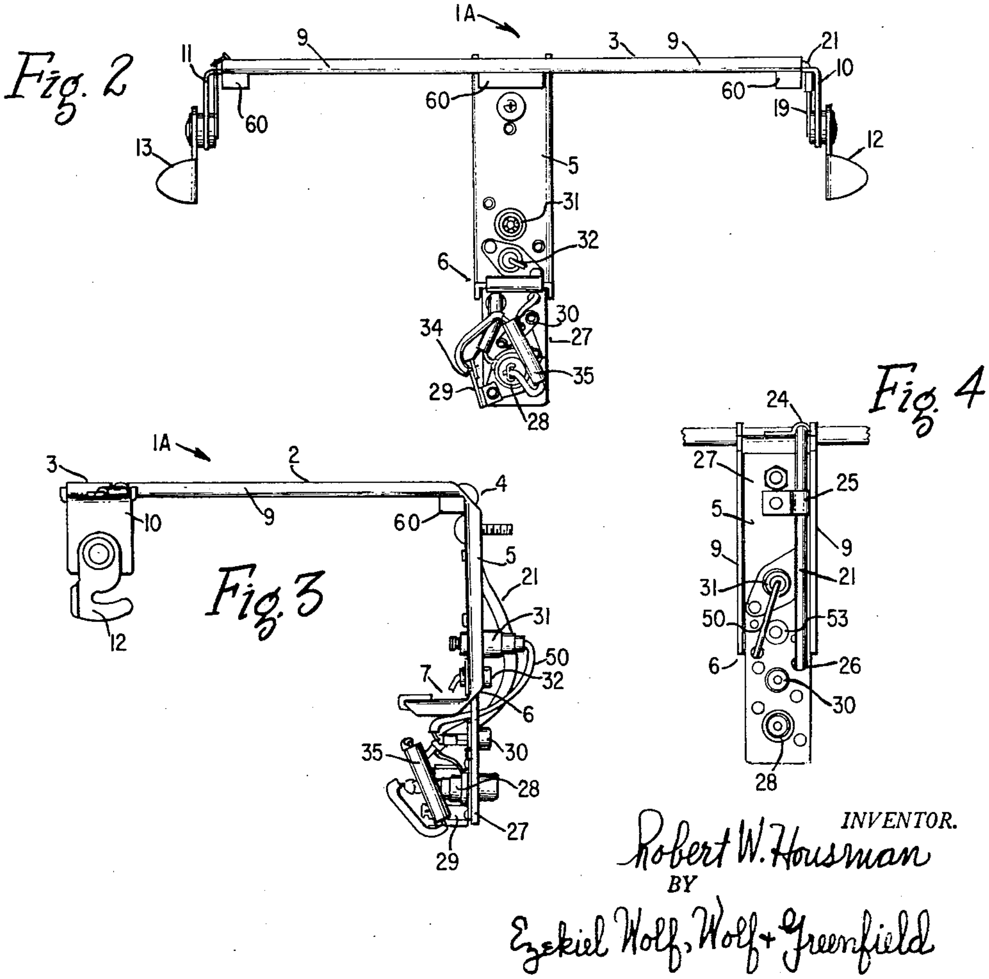
FIG. 2 is a front end view of the embodiment illustrated in FIG. 1.
FIG. 3 is a side view looking from the right to FIG. 1.
FIG. 4 is a fragmentary rear end view.

These hooks 12 and 13 are in turn supported and electrically coupled to the bracket. A rivet 15 projects through successive holes in a metal washer 16, hook 12, insulating washer 17, lip 10, insulating washer 18, and terminal lug 19 (see FIG. 7). The rivet is suitably flared to secure these components in the arrangement indicated, and to permit pivotal rotation of the hook 12. Shoulder sections 20 on the washers 17 and 18 space the rivet 15 from the lip 10 and thereby electrically insulate the hook 12 from the lip 10. Hook 13 is similarly insulated from lip 11. The upper end of one lug 19 connected to hook 13 projects through an opening in the cross bar 3 and is connected to the tab 20 which in turn is grounded to the cross bar 3. The other lug 19 is electrically connected to the hook 12 and is insulated from the cross bar 3 and lip 10. This lug 19 is electrically connected to the insulated lead 21 projecting through the opening 22. The lead 21 is secured to the cross bar and stem by clips 24 and to a mounting board 27 on the arm section 5 by clip 25. This lead 21 extends from the right end of cross bar 3 as viewed in FIG. 1, along the stem 2 to the arm section 5 passing through a hole 26 at the lower end of the mounting board 27.

The board 27 is formed of a conductive material and is rigidly secured to the rear of arm section 5. The board 27 supports a coaxial receptacle 28, insulated terminal strip 29, plug receptacle 30, a second coaxial plug 31 and a power connecting receptacle 32.

One conductor of the coaxial lead 21 is connected to the mounting board 27 and is thereby grounded. The other conductor is connected to a terminal 34 on the strip 29. This terminal 34 also has connected to it one lead of a choke 35. The other lead is connected to the center connector of coaxial receptacle 28. The outer casing of receptacle 28 is grounded to the board 27.

The receptacle 28 is adapted to receive the antenna plug 40. The antenna plug 40 is connected to the external antenna of the automobile. The coaxial plug 31 is connected by the coaxial line 50 to the plug receptacle 30. The plug 31 is positioned to be coupled through a socket on the rear wall of the radio to the internal speaker circuit of the radio. The plug receptacle 30 is adapted to receive an external speaker plug 51 (FIG. 5) so as to connect an external speaker in parallel with the internal speaker.

The receptacle 53, mounted on the board 27 may be coupled to the internal power supply of the radio 4A. This receptacle is adapted to receive plug 52 (FIG. 5). The plug 52 is in turn connected across the battery of the automobile whereby external power may be supplied to the portable radio 4A when positioned in the bracket as illustrated in FIG. 6.

Resilient cushions 60 may be suitably secured to bracket to cushion the radio when inserted into the bracket.

What is claimed is:

1. A bracket for supporting a portable radio having means projecting from opposite sides thereof comprising a plurality of integral components adapted to be positioned about said radio including a T-shaped member having an integral cross bar and stem, an arm section normal to and continuous with said stem and having a lip at the free end thereof, hooks adapted to engage said projecting means, and means for pivotally supporting said hooks at the ends of said cross bar.

2. A device as set forth in claim 1 wherein said means supporting said hooks include downwardly turned lips integral with the ends of said cross bar and means including a supporting shaft pivotally interengaging said hooks and downwardly turned lips.

3. A device as set forth in claim 1 having means electrically grounding one only of said hooks to said bracket, and means electrically connecting the other of said hooks to a means for electrically coupling said hook to an external circuit.

4. A device as set forth in claim 1 having means electrically grounding one only of said hooks to said bracket, means mounting a plug receptacle on said arm section for receiving a plug connected to an external antenna, and means electrically connecting said receptacle and the other of said hooks.

5. A device as set forth in claim 4 wherein said means mounting a plug receptacle also has mounted thereon a plurality of other receptacles and other plugs electrically coupled to said receptacles, said other receptacles adapted to receive plugs connected to external circuits and said other plugs adapted to be connected to said radio.

6. In combination with a portable radio having exposed and projecting contacts coupled to the internal circuitry thereof, means for removably engaging and electrically coupling said radio to external circuitry comprising bracket means having conductive engaging means for supporting said radio for at least partially forming an electrically conductive circuit for coupling the internal circuitry of said radio to an external circuit said bracket means including pivotable hook means engageable with said projecting contacts to partially support and partially form said electrically conductive circuit.

7. A bracket for supporting a portable radio having generally rectangular sides and ends, and top and bottom walls, and with projections at said sides electrically coupled one to the ground and the other to the internal antenna of said radio, comprising a T-shaped member having an integral cross bar and stem, adapted to over lie said top wall, an arm section integral with the free end of and normal to said stem adapted to lie in facing relation with said rear wall and terminating at its lower end in a forwardly extending lip adapted to engage and support the bottom of said radio, a pair of downwardly extending lips formed one at each end of said cross bar, a pair of conductive hooks, means insulatingly and pivotally supporting said hooks on said downwardly extending lips, means forming a supporting board on said arm section having a portion projecting downwardly below said forwardly extending lip, a plurality of plug and electrically connected receptacle means mounted on said board adapted to electrically interengage internal circuitry of said radio and an external power supply and loudspeaker, a plug receptacle mounted on said board adapted to receive a plug electrically connected to an external antenna, means electrically connecting said plug receptacle to one of said other hooks, and means electrically connecting said other hook to said cross bar.

References Cited in the file of this patent

UNITED STATES PATENTS 2,077,284 TePas ---------------- Apr. 13, 1937